United States Patent [19]

Oshiba

[11] Patent Number: 5,132,522
[45] Date of Patent: Jul. 21, 1992

[54] INFORMATION-READING METHOD

[75] Inventor: Mitsuo Oshiba, Hachioji, Japan

[73] Assignee: Olympus Optical Co., Ltd., Tokyo, Japan

[21] Appl. No.: 647,727

[22] Filed: Jan. 30, 1991

[51] Int. Cl.$^5$ .......................... G06K 7/10; G06K 7/00; G06K 5/00; G11B 25/04

[52] U.S. Cl. .................................. 235/454; 235/436; 235/437; 360/2

[58] Field of Search ...................... 235/454, 436, 437; 369/32, 44.25, 44.26, 44.28, 275.3, 53, 54, 58; 360/10.1, 10.2, 49, 2, 78.14; 371/2.1, 67.1

[56] References Cited

U.S. PATENT DOCUMENTS

| | | | |
|---|---|---|---|
| 4,213,040 | 7/1980 | Gokey et al. | 235/454 |
| 4,313,134 | 1/1982 | Rustman et al. | 369/53 |
| 4,546,462 | 10/1985 | Koichi et al. | 369/44.32 |
| 4,652,730 | 3/1987 | Marshall | 235/456 |
| 4,730,290 | 3/1988 | Takasa et al. | 369/44.25 |
| 4,782,221 | 11/1988 | Brass et al. | 235/454 |
| 4,839,878 | 6/1989 | Inoue | 369/58 |
| 4,860,275 | 8/1989 | Kakinuma et al. | 235/487 |
| 4,879,704 | 11/1989 | Takagi et al. | 369/58 |
| 4,885,458 | 12/1989 | Horiguchi et al. | 235/454 |
| 4,924,199 | 5/1990 | Hashimoto et al. | 235/456 |
| 4,956,832 | 9/1990 | Miyasaka et al. | 369/58 |
| 4,970,712 | 11/9990 | Tsuruoka et al. | 235/494 |
| 5,008,552 | 4/1991 | Kuramochi et al. | 235/483 |

FOREIGN PATENT DOCUMENTS 63-37876 2/1988 Japan .

Primary Examiner—Stuart S. Levy
Assistant Examiner—Tan Nguyen
Attorney, Agent, or Firm—Frishauf, Holtz, Goodman & Woodward

[57] ABSTRACT

An information-reading method employs an optical card including, a data section made by a linear information track, an address section for storing an address of the information track, and a guide section located adjacent to the address section and scanned before reading the address section. The address section and guide section are located at each end of said data section. The address and guide sections located at one end of the data section and the address and guide sections located at the other end of the data section are arranged in the same order in one scanning direction of the information track. The method comprises the steps of reading two addresses out of the address sections, by scanning the information track in the one scanning direction, and comparing the two addresses with each other, to thereby detect a tracking error.

8 Claims, 4 Drawing Sheets

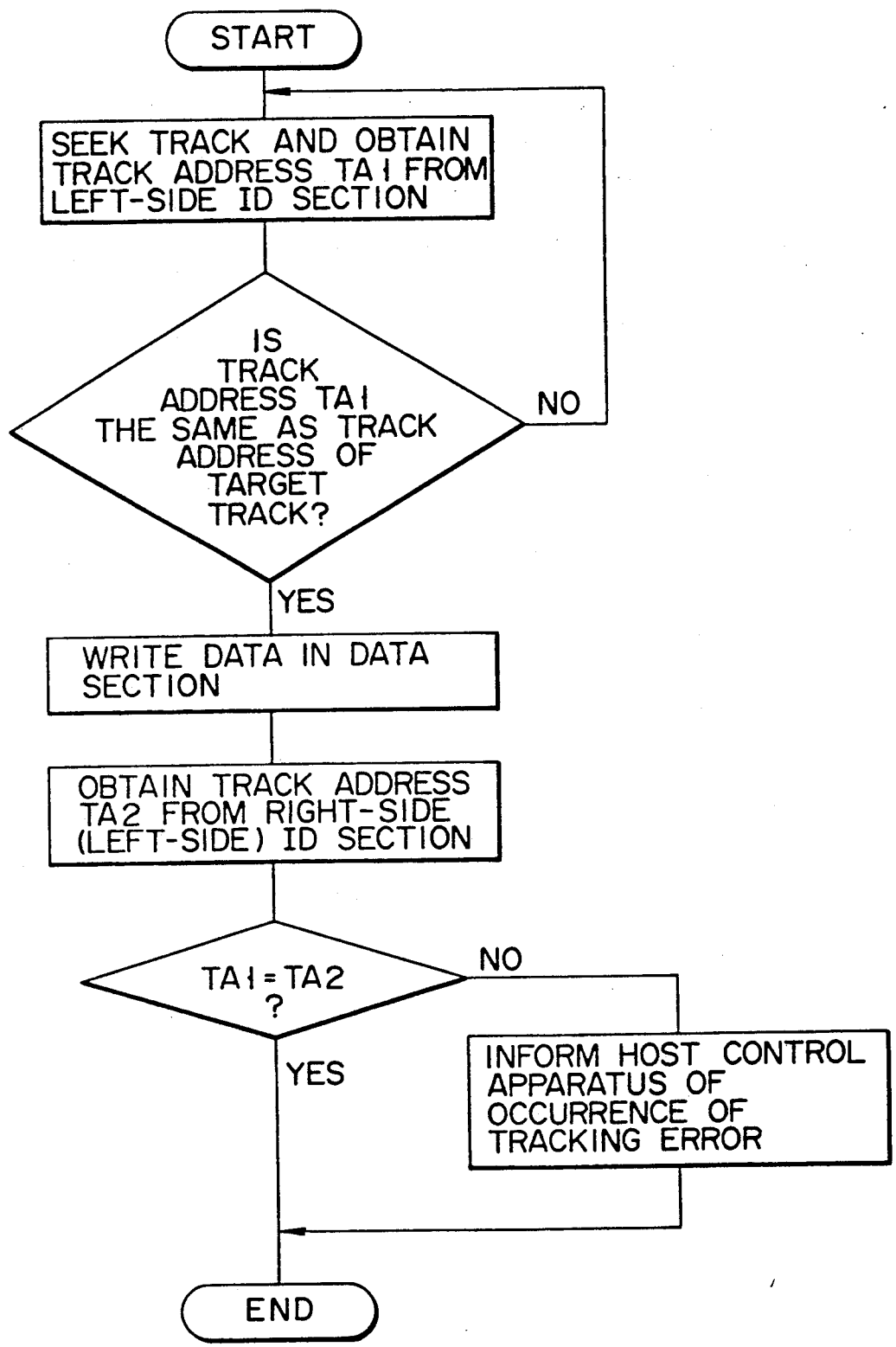
F I G. 6

INFORMATION-READING METHOD

BACKGROUND OF THE INVENTION

1. Field of the Invention

The present invention relates to an information-reading method using an optical card, etc.

A data recording/reproducing system which is of a type employing an optical card as a recording medium is well known in the art. This type of data recording/reproducing system comprises: an optical card which has a plurality of parallel tracks; an optical head for optically recording data on the optical card and optically reproducing the data from the card; and a device for driving the optical card and the head relative to each other such that the optical head moves in both the longitudinal and widthwise directions of tracks.

An example of a known optical card is disclosed in Published Unexamined Japanese Patent Application (PUJPA) No. 63-37876. As is shown in FIG. 1, the known optical card 1 has a plurality of tracks 2 extending in parallel to one another in the longitudinal direction of the card 1. Each track 2 is comprised of: ID sections 3a and 3b which are located at the respective longitudinal ends and are used for storing track address information; and a data section 4 which is located between the ID sections 3a and 3b and is used for storing data. FIG. 2 shows one of the tracks 2 in an enlarged scale. As is shown in FIG. 2, the left-side ID section 3a is made up of: a pull-in area 5a of a data-separation PLL; an area 6a in which a synchronous signal indicating the start of track address information is recorded; and an area 7a in which the track address information is recorded. Likewise, the right-side ID section 3b is made up of: a pull-in area 5b of a data-separation PLL; an area 6b in which a synchronous signal indicating the start of track address information is recorded; and an area 7b in which the track address information is recorded. It should be noted that areas 5a, 6a and 7a of the left-side ID section 3a and areas 5b, 6b and 7b of the right-side ID section 3b are symmetrical with each other.

A description will be given as to how data is written or read out of the data section 4.

The optical card 1 is irradiated with a convergent light beam, with the light beam reflected by the optical card 1 being received by the optical head. In this state, the optical card 1 and the optical head are driven relative to each other such that the optical head moves in the lateral direction of the tracks of the card 1, so as to confirm the position of the current track. The position of the current track and the position of a target track are compared with each other, for the measurement of the distance therebetween. The optical head is moved for the measured distance in the widthwise direction of tracks, to thereby seek the target track. When the optical head has reached the target track, it writes data on the data section 4 of the target track or reads it out of that data section 4. In the case where the optical head moves from the left-side portion of the card 1 to the right-side portion thereof (which direction will be hereinafter referred to as a "forward direction"), the optical head reads information from the right-side ID section 3b, to thereby confirm that the optical head is at the target track. Conversely, in the case where the optical head moves from the right-side portion of the card 1 to the left-side portion thereof (which direction will be hereinafter referred to as a "backward direction"), the optical head reads information from the left-side ID section 3a, to thereby confirm that the optical head is at the target track.

Usually, the optical card 1 is carried with the user. It is therefore likely that dust particles will adhere to the recording surface of the optical card 1. It is also likely that the recording surface of the optical head 1 will be scratched. If the recording surface of the optical card 1 has dust particles or scratches thereon, the optical head cannot accurately move to the target track, resulting in a tracking error.

When data is written in the data section 4 of a given track 2 or read out of the data section 4, the information stored in either ID section 3a or 3b is read, as mentioned above In the prior art, however, this information is read merely for confirming whether or not the radial beam spot is located at the given track 2. This being so, the track address information is read only once; it is read immediately before data is written or read. However, this prior art technique does not always ensure satisfactory data reading if the card 1 has dust particles or scratches on the recording surfaces. Assume that the optical head is shifted from the target track to an adjacent track during data writing, due to dust particles or scratches. Since such a shifting movement of the optical head cannot be detected in the prior art technique, data is undesirably written on the data section 4 of the adjacent track, not that of the target track.

SUMMARY OF THE INVENTION

Accordingly, an object of the present invention is to provide an optical card which enables reliable detection of a tracking error.

According to the present invention, there is provided an optical card which is moved relative to an optical head so as to record or reproduce data from a plurality of tracks, and which comprises two ID sections located at the respective ends of a data recording section. When the data recording section is accessed, the information stored in one of the ID sections is compared with the information stored in the other ID section, such that a tracking error which may occur during access to the data recording section can be detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is a flowchart illustrating how data is written in the first embodiment.

DETAILED DESCRIPTION OF THE PREFERRED EMBODIMENTS

Embodiments of the present invention will now be described, with reference to the accompanying drawings.

Figure 3:
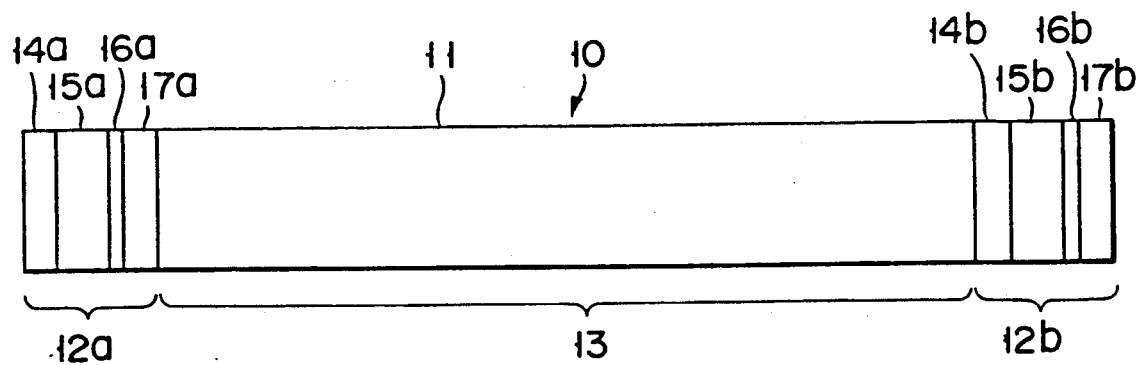
FIG. 3 is an enlarged view of a track of an optical card used by a first embodiment of the present invention.
Figure 4:
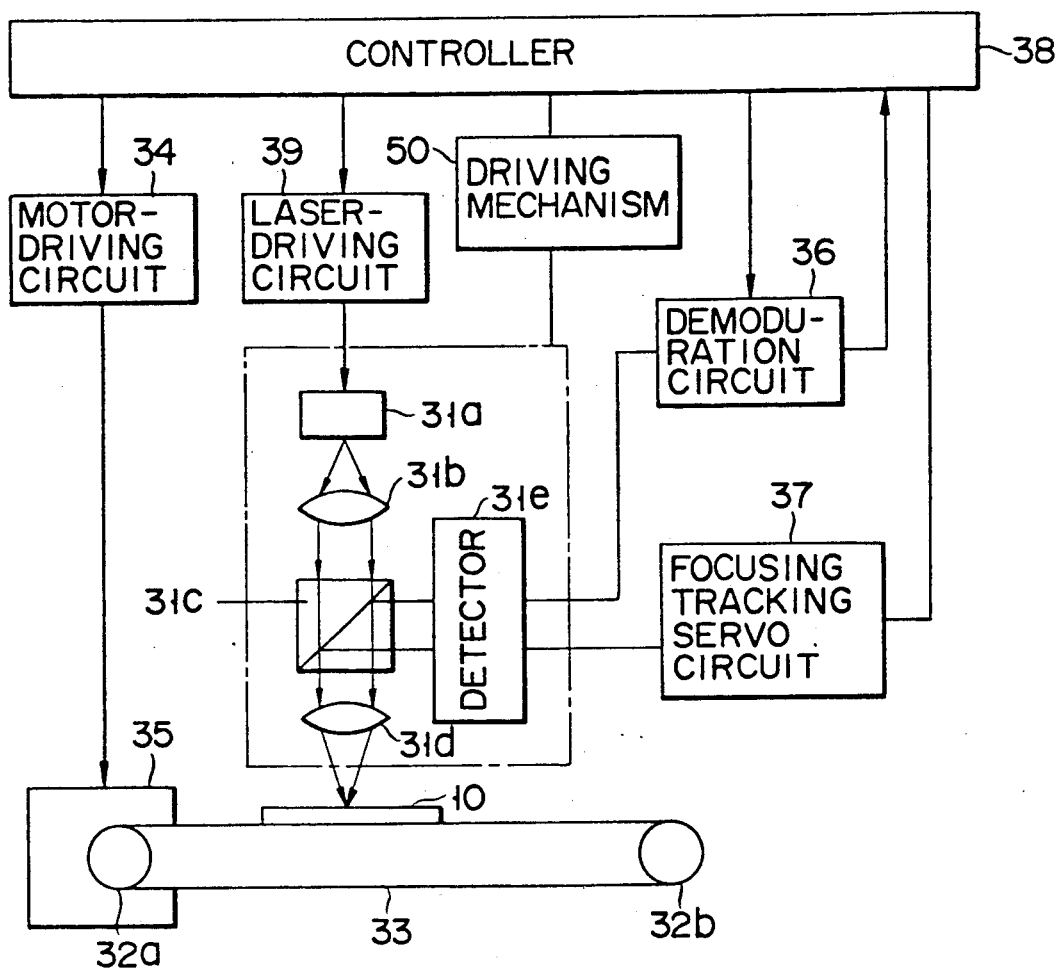
FIG. 4 illustrates a data recording/reproduction device used with the optical card.

FIG. 3 illustrates a track which is provided on the optical card which is used to a first embodiment of the present invention, and FIG. 4 illustrates a data recording/reproduction device which is used for the optical card shown in FIG. 3.

Referring to FIG. 4, an optical card 10 is mounted on a conveyance belt 33 stretched between a pair of pulleys 32a and 32b. When a reversible motor 35 is driven by a motor-driving circuit 34, pulley 32a is rotated, and the card 10 mounted on the belt 33 moves in the longitudinal direction thereof. An optical head 31 is made up of a laser diode 31a, a collimator lens 31b, a beam splitter 31c, an objective lens 31d, and a detector 31e. A divergent light beam emitted by the laser diode 31a is collimated by the collimator lens 31b. After passing through the beam splitter 31c, the collimated light beam is converged by the objective lens 31d such that a radial beam slot is formed on the recording surface of the optical card 10. The light beam reflected by the optical card 10 is reflected by the beam splitter 31c, and is then received by the detector 31e. This detector 31e converts the light beam into an electric signal.

The optical card 10 and the optical head 31 can be driven relative to each other in such a way that the optical card 10 moves in the longitudinal direction thereof, i.e., in the direction in which the tracks of the card 10 extend. Further, the optical head 31 is movable in the widthwise direction of the card 10, i.e., in the direction perpendicular to the drawing sheet of FIG. 4.

An output signal of the detector 31e is supplied to both a demodulating circuit 36 and a focusing/tracking servo circuit 37. The demodulating circuit 36 derives a read signal from the output signal of the detector 31e. The focusing/tracking servo circuit 37 produces a focusing error signal which represents the degree of unfocusing of the radial beam spot formed on the recording surface. The focusing/tracking servo circuit 37 also produces a tracking error signal which represents how the optical head 31 is shifted from a given track. On the basis of the focusing error signal and the tracking error signal, a driving mechanism 50 moves the optical head 31 in the focusing direction and in the tracking direction (which is a widthwise direction of the tracks) until the radial beam spot is formed at an optimal position on the card 10.

The read signal obtained by the demodulating circuit 36 is supplied to a controller 38, so as to detect a data reproduction signal and a track address signal.

Next, a description will be given as to how information or data is read or written.

At the time of reading data, the controller 38 controls a laser-driving circuit 39 such that a read beam having a low luminance level is emitted from the laser diode 31a. The controller 38 also controls the motordriving circuit 34, the demodulating circuit 36 and the focusing/tracking servo circuit 37 such that a desirable track is sought and the data is read therefrom on the basis of the track address signal demodulated by the demodulating circuit 36. At the time of writing data, a desirable track is sought, and then the laser-driving circuit 39 is driven such that a write beam having a high luminance level is emitted from the laser diode 31a. The write beam is modulated in accordance with the data to be written. Using this modulated write beam, the data is written on the track of the card 10.

Figure 1:
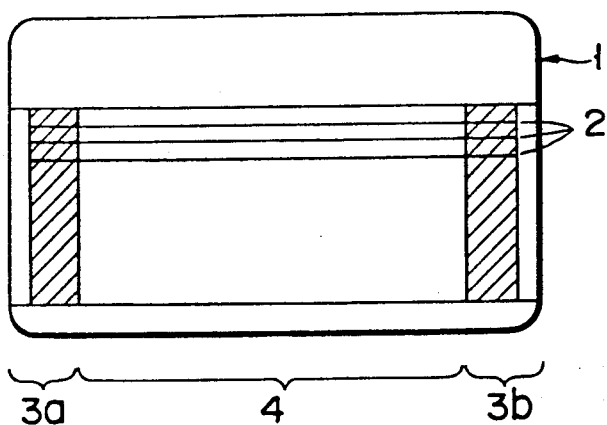
FIG. 1 is a view of a conventional optical card.
Figure 2:
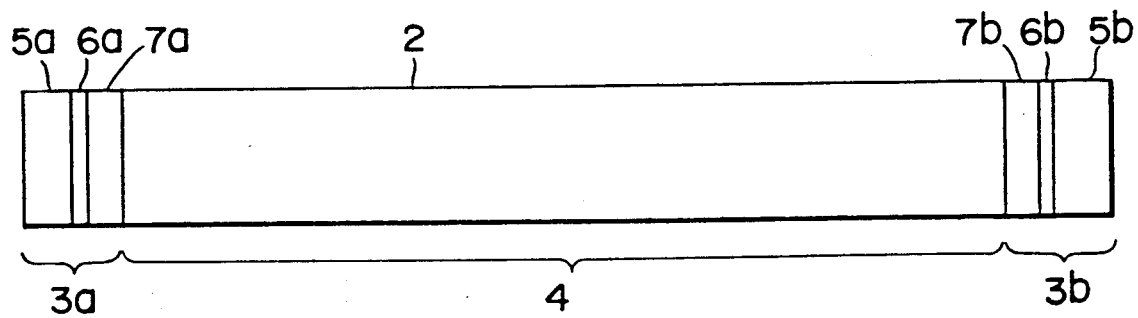
FIG. 2 is an enlarged view of a track of the conventional optical card.

The optical card 10 of the first embodiment has a structure similar to that of the conventional card shown in FIG. 1, but differs from the conventional one by the track format it employs. More specifically, the ID sections of each track of the optical card 10 differ from the ID sections shown in FIG. 2.

Referring to FIG. 3, each track 11 is comprised of: ID sections 12a and 12b which are located at the respective longitudinal ends and store track address information; and a data section 13 which is located between the ID sections 12a and 12b and stores data. The left-side ID section 12a is made up of: an ID mark 14a indicating the start of the ID section; a pull-in area 15a of a data-separation PLL; an area 16a in which a synchronous signal indicating the start of track address information is recorded; and an area 17a in which the track address information is recorded. The right-side ID section 12b has the same structure as the left-side one 12a, and is made up of: an ID mark 14b; a pull-in area 15b; an area 16b in which a synchronous signal is recorded; and an area 17b in which track address information is recorded. It should be noted that the ID mark and areas of the left-side ID section 12a and those of the left-side ID section 12b are not symmetrical with each other.

Data is written on the optical card 10 having the above-mentioned track format by following the procedures shown in FIG. 6. The data writing is controlled on the basis of the commands issued by the controller 38. In the description below, it is assumed that the optical card 10 and the optical head 31 are driven relative to each other in such a manner that the optical head 31 moves from the left side of the card 10 to the right side thereof.

(1) The optical head 31 reads the left-side ID section 12a, to thereby obtain track address TA1 from area 17a.

(2) If track address TA1 differs from the track address of a target track, another track is sought. If track address TA1 is the same as the track address of the target track, then data is written in the data section 13, and procedure (3) is effected.

(3) The optical head 31 reads right-side ID section 12b, to thereby obtain track address TA2 from area 17b.

(4) If track address TA2 is the same as track address TA1, it is determined that the data writing has been completed without tracking error, and the operation is brought to an end. However, if track address TA2 differs from track address TA1, it is determined that a tracking error occurs during the data writing, and an abnormality signal is supplied to a host control apparatus (i.e., an apparatus for controlling the data recording/reproduction device shown in FIG. 4). Upon the detection of the abnormality signal, the host control apparatus performs control which is appropriate to the situation. Usually, it causes the optical head 31 to move to a track which is different from that on which the data was written, and the data is written on that new track.

Data is read from a data section 13 of the optical card 10 by following procedures similar to the above procedures (1) to (4).

With the data being read or written in the above manner, it is possible to reliably detect even a tracking error which may occur during access to the data section 13.

Figure 5:
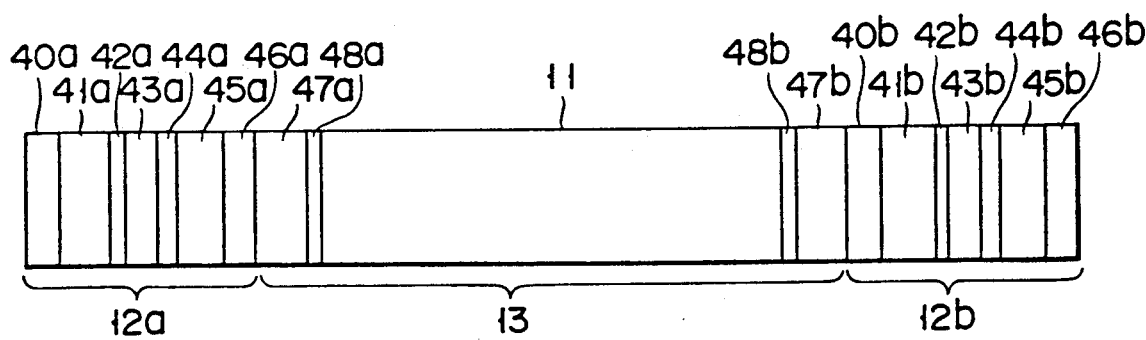
FIG. 5 is an enlarged view of a track of an optical card used by a second embodiment of the present invention.

FIG. 5 illustrates a track which is provided on the optical card of the second embodiment of the present invention.

In the first embodiment shown in FIG. 3, the optical card 10 and the optical head 31 are driven relative to each other such that the optical head 31 moves in the forward direction only. In the second embodiment shown in FIG. 5, however, the optical head 31 is movable in not only the forward direction but also the backward direction.

Referring to FIG. 5, each track 11 is comprised of: ID sections 12a and 12b which are located at the respective longitudinal ends and store track address information; and a data section 13 which is located between the ID sections 12a and 12b and stores data. The left-side ID section 12a is made up of the following: an ID mark 40a which indicates the start of the ID section when data reading is performed in the forward direction; a pull-in area 41a of a dataseparation PLL used when data reading is performed in the forward direction; an area 42a for storing a synchronous signal which indicates the start of track address information when data reading is performed in the forward direction; an area 43a for storing track address information; an area 44a for storing a synchronous signal which indicates the start of the track address information when data reading is performed in the backward direction; a pull-in area 45a of a dataseparation PLL used when data reading is performed in the backward direction; and an ID mark 46a which indicates the start of the ID section when data reading is performed in the backward direction. The right-side ID section 12b has the same structure as the left-side one 12a and is made up of the following: an ID mark 40b which indicates the start of the ID section when data reading is performed in the forward direction; a pull-in area 41b of a data-separation PLL used when data reading is performed in the forward direction; an area 42b for storing a synchronous signal which indicates the start of track address information when data reading is performed in the forward direction; an area 43b for storing track address information; an area 44b for storing a synchronous signal which indicates the start of the track address information when data reading is performed in the backward direction; a pull-in area 45b of a dataseparation PLL used when data reading is performed in the backward direction; and an ID mark 46b which indicates the start of the ID section when data reading is performed in the backward direction.

The track address information stored in areas 43a and 43b is serial data which is modulated from left to right in FIG. 5 according to a predetermined modulation rule. When areas 43a and 43b are scanned in the forward direction, the track address information is demodulated in an ordinary manner, for reproduction. Conversely, when areas 43a and 43b are scanned in the backward direction, it is demodulated in the manner opposite to the ordinary manner. The reproduction of track address information is performed by selecting one of two circuits by means of a switch (not shown) in accordance with the direction in which areas 43a and 43b are scanned. The synchronous signals stored in areas 42a, 44a, 42b and 44b are comprised of a fixed pattern of bits which are not used in the above-mentioned modulation rule. These bits are recorded in areas 42a, 44a, 42b and 44b from left to right in FIG. 5, and the order in which the bits are read is reversed between the forward-direction scan and the backward-direction scan. In other words, the bits of the synchronous signals are read by selectively using one of two circuits in accordance with the direction in which areas 42a, 44a, 42b and 44b are scanned. It should be noted that the method of reading or reproducing the track address information and synchronous signals is not limited to the above, and may be modified in accordance with the need.

In the case of the second embodiment, it is necessary to detect in which direction (the forward direction or the backward direction) the optical head 31 moves with reference to the card 10. This detection can be easily accomplished by using the control signals which the motor-driving circuit 34 shown in FIG. 4 issues for controlling the rotating direction of the reversible motor 35. No special signal is required for the detection of the moving direction of the optical head 31.

The data stored in the data section 13 is read in either the forward direction or the backward direction. When data reading is performed in the forward direction, the pull-in area 47a and synchronous-signal area 48a provided on the left side of the data section 13 are used. When data reading is performed in the backward direction, the pull-in area 47b and synchronous-signal area 48b provided on the right side of the data section 13 are used.

Figure 7:
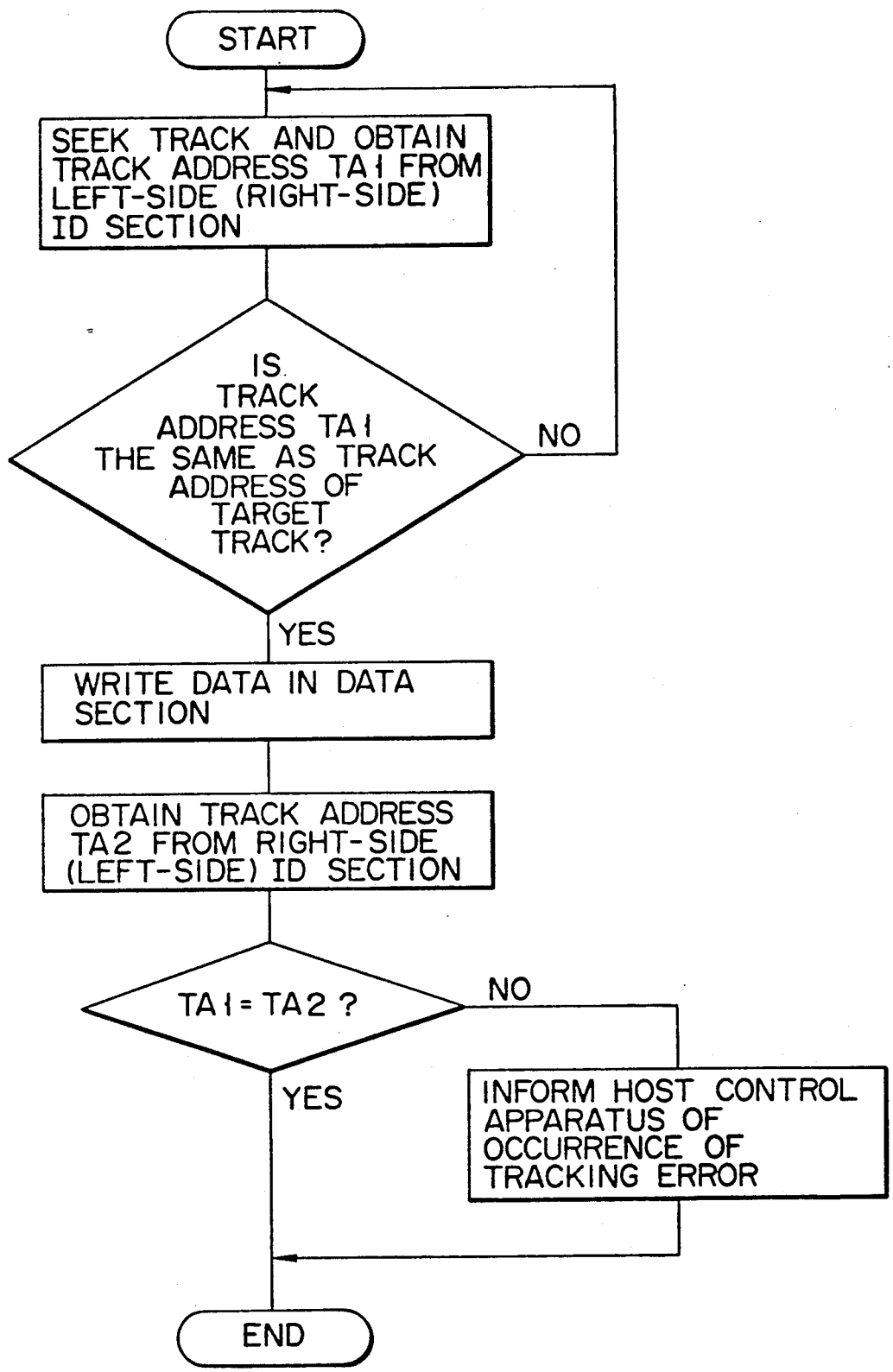
FIG. 7 is a flowchart illustrating how data is written in the second embodiment.

A description will be given, with reference to FIG. 7, of the procedures which the controller 38 executes for writing data on the data section 13 of the optical card 10 of the second embodiment.

(1) The optical head 31 reads the ID section (the left-side ID section 12a in the case of the forward-direction scan, and the right-side ID section 12b in the case of the backward-direction scan), to thereby obtain the information regarding track address TA1.

(2) If track address TA1 differs from the track address of a target track, procedure (1) is repeated with respect to another track. If track address TA1 is the same as the track address of the target track, then data is written in the data section 13, and procedure (3) is effected.

(3) The optical head 31 reads the other ID section (the right-side ID section 12b in the case of the forward-direction scan, and the left-side ID section 12b in the case of the backward-direction scan), to thereby obtain track address TA2.

(4) If track address TA2 is the same as track address TA1, it is determined that the data writing has been completed without any tracking error, and the operation is brought to an end. However, if track address TA2 differs from track address TA1, it is determined that a tracking error occurred during the data writing, and an abnormality signal is supplied to a host control apparatus.

According to the second embodiment, a tracking error which may occur during access to the data section 13 can be reliably detected regardless of the direction of the scan. The present invention is not limited to the above embodiments, and can be modified in various manners without departing from the spirit and scope of the invention.

In the above embodiments, the ID sections are constituted by two blocks which are formed on the respective sides of the optical card. However, the number of blocks constituting the ID sections need not be two; it can be arbitrary determined in accordance with the need. If three blocks are formed on each side of the card (i.e., three ID sections at each end of one track), the optical head reads three ID sections before reading or writing of data. If at least two of the ID sections indicate the same track, this track can be regarded as being the target track with high possibility. Accordingly, the target track can be identified very reliably. In addition, the number of times at which the problem arising from a reading error occurs can be reduced to ⅓ in comparison with the case where only one ID section is formed at each end of one track. Moreover, since the track addresses stored in six ID sections are referred to for seeking a target track, the target track can be sought with high accuracy, and reliable writing or reading of data is ensured.

In the above embodiments, the guide section which is included in each ID section and is scanned before track address information is read is made up of a n ID mark, a synchronous signal-recorded area, and a pull-in area of bit synchronization. However, the guide mark may be made up only of the synchronous signal-recorded area and the pull-in area.

In the second embodiment mentioned above, the track address information stored in areas 43a and 43b is serial data which is modulated from left to right in FIG. 5. However, the track address information in area 43b may be serial data which is modulated from right to left in FIG. 5, with the serial data in area 43a being modulated from left to right. In this case, the serial data firstly read is demodulated in an ordinary manner, and the serial data next read is demodulated in the manner opposite to the ordinary manner.

According to the present invention, the data stored in the ID sections located on the respective sides of the optical card can be read during the one-direction movement of the optical head relative to the optical card. With the data in one ID section being compared with the data in the other, a tracking error which may occur during access to the data section can be reliably detected.

Additional advantages and modifications will readily occur to those skilled in the art. Therefore, the invention in its broader aspects is not limited to the specific details, and illustrated examples shown and described herein. Accordingly, various modifications may be made without departing from the spirit or scope of the general inventive concept as defined by the appended claims and their equivalents.

What is claimed is:

1. An information reading and writing method for reading data from and for writing data onto a card-like recording medium which is scanned in a first scanning direction and a second scanning direction opposite to the first scanning direction, the method comprising:
   providing at least one linear information track on said card-like recording medium;
   delineating a data section for storing modulated data in said at least one linear information track, said data section having first and second end portions;
   delineating first and second address sections each storing modulated address data, respectively on each of said first and second end portions of said data section;
   providing first and second guide sections respectively adjacent to said first and said second address sections;
   the first guide section being positioned to be scanned before the first address section, and the second guide section being positioned to be scanned before the second address section when said at least one linear information track is scanned in said first scanning direction;
   reading said address data out of each of said first and second address sections by scanning at least one linear information track in said first scanning direction;
   demodulating said modulated data in said data section and said first and second address sections in said at least one linear information track as said linear information track is scanned in said first and second scanning directions;
   serially storing the address data in said first address section in a first serial order;
   serially storing the address data in said second address section in a second serial order which is the same as said first serial order; and
   serially demodulating the address data in said first and second address sections,
   comparing the thus read out address data from each of said address sections of said at least one linear information track with each other, to detect errors therebetween.

2. The method according to claim 1, further comprising:
   storing in each of said first and second guide sections bit synchronization pull-in data; and synchronous signal data for indicating that address data is to be scanned in said at least first scanning direction.

3. The method according to claim 1, wherein said card-like reading medium has a plurality of tracks, and further comprising storing track address data in each of said first and second address sections.

4. The method according to claim 1, further comprising providing more than one address in the address data respectively stored in said first and second address sections.

5. The method according to claim 1, wherein:
   the serial address data stored in the first and second address sections is modulated and demodulated in a given manner when the recording medium is scanned in the first scanning direction, and the serial address data stored in the first and second address sections is modulated and demodulated in a manner opposite to said given manner when the recording medium is scanned in the second scanning direction, further comprising a step of changing the demodulating manner of one of said read out address data to cause the demodulation manners to be the same.

6. A scannable card-like data recording medium which is scanned in a first direction and a second direction opposite to the first direction, comprising:
   a substantially flat card-like substrate;
   a linear information track defined in said substantially flat card-like substrate;
   said linear information track including:
   a data section for storing modulated data, said data section having first and second end portions;

first and second address sections for storing modulated address data, which is used for tracking error detection, positioned respectively on said first and second end portions of said data section;

first and second guide sections positioned respectively adjacent to said first and second address sections;

said first guide section being positioned to be scanned before said first address section and said second guide section being positioned to be scanned before said second address section when said card-like data recording medium is scanned in said first scanning direction; and the address data in said first address section being stored in a first serial order, and the address data in said second address section being stored in a second serial order which is the same as said first serial order.

7. A card-like data recording medium according to claim 6, wherein each of said first and second guide sections include:

an area for storing bit synchronization pull-in data; and an area for storing synchronous signal data for indicating address data is to be scanned in said at least first scanning direction.

8. A card-like data recording medium according to claim 6, further comprising:

a plurality of linear information tracks defined on said substantially flat card-like substrate, each of said plurality of linear information tracks including first and second address sections which respectively store track data.

* * * * *